S. M. HOLTON.
COMBINED DISH RINSER AND DRIER.
APPLICATION FILED JULY 13, 1912.
1,060,763.
Patented May 6, 1913.
2 SHEETS—SHEET 2.
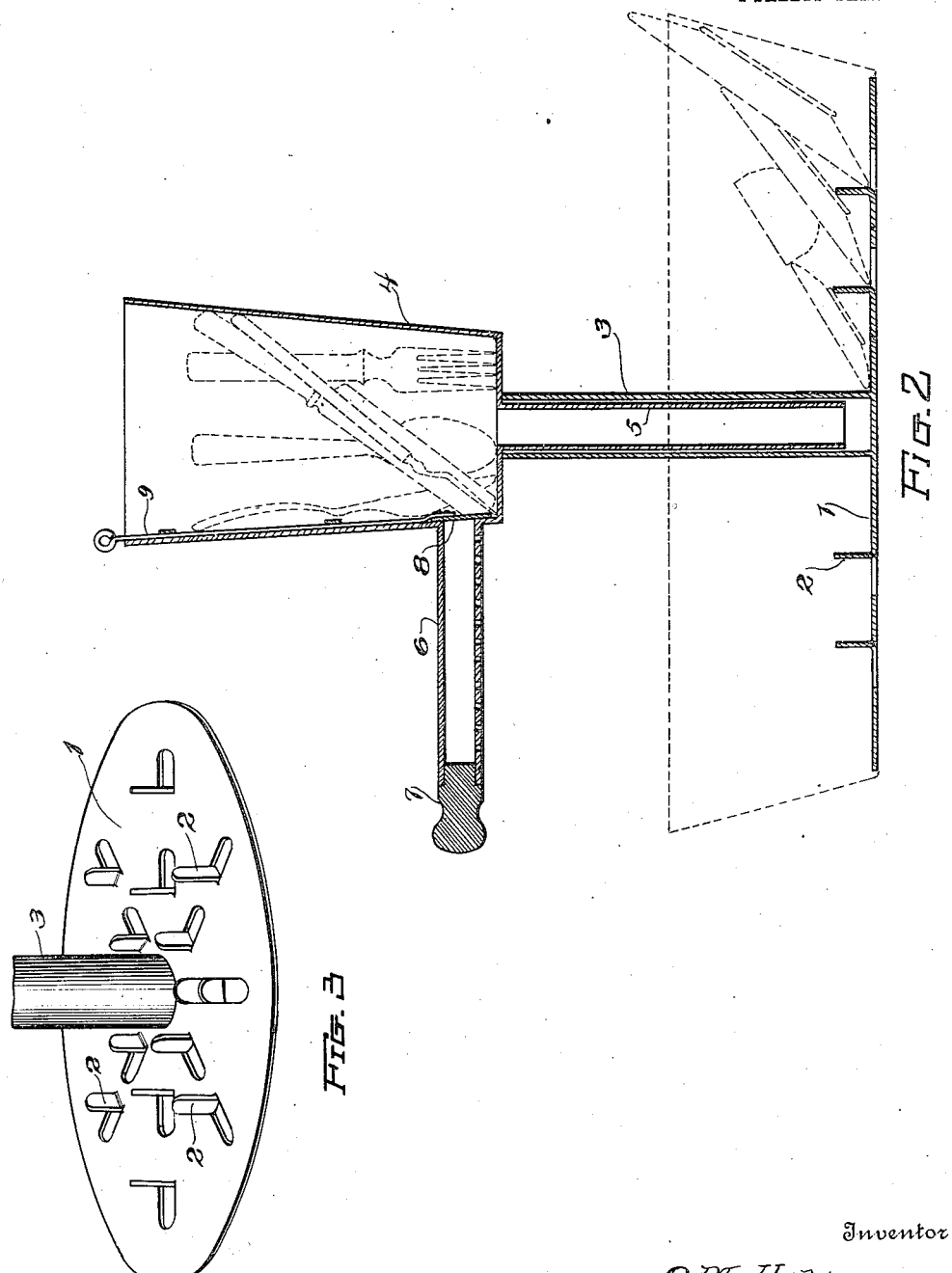
Witnesses
W. H. Mulligan.
V. B. Hillyard.
Inventor
S. M. Holton
By Victor J. Evans
Attorney

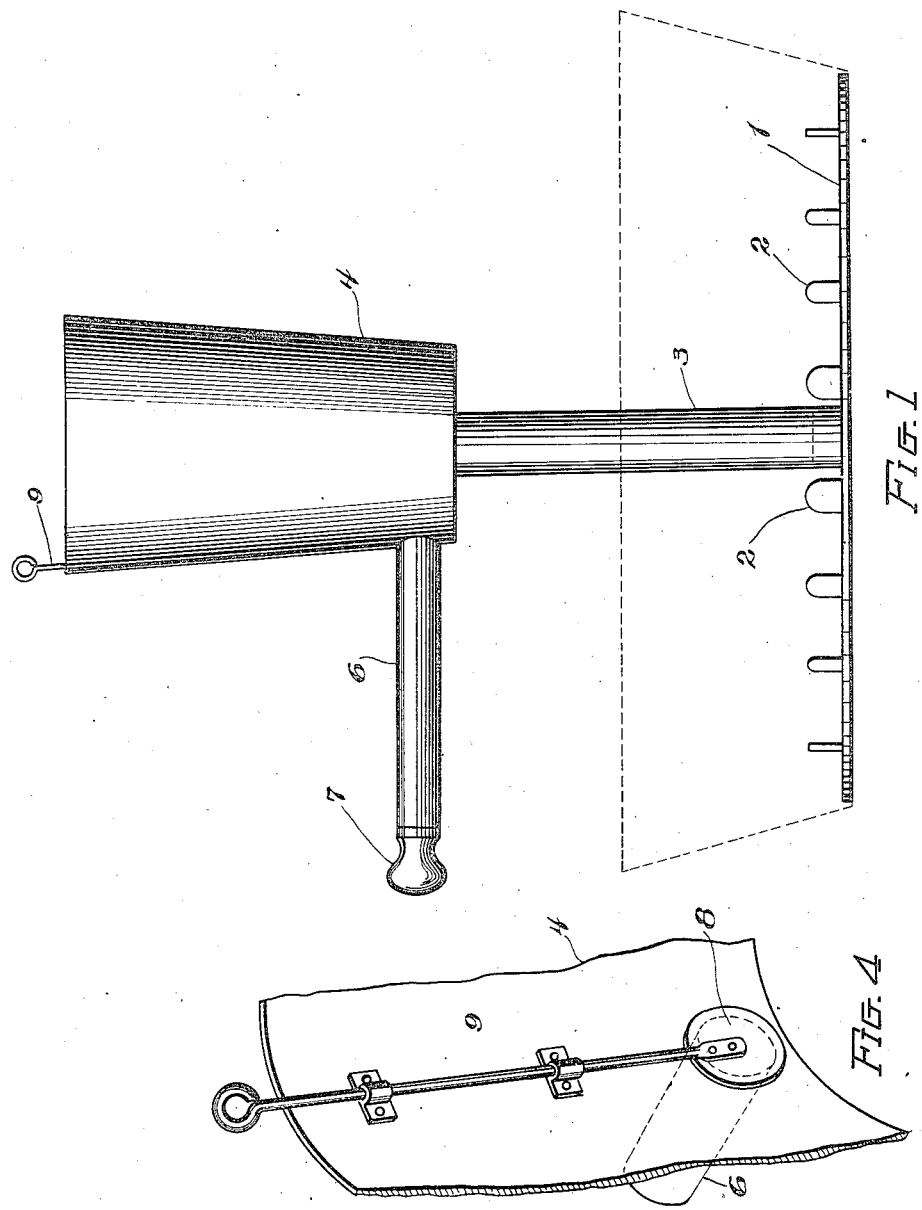

UNITED STATES PATENT OFFICE.

SAMUEL M. HOLTON, OF BATTLE CREEK, MICHIGAN.

COMBINED DISH RINSER AND DRIER.

1,060,763.   Specification of Letters Patent.   Patented May 6, 1913.

Application filed July 13, 1912. Serial No. 709,155.

*To all whom it may concern:*

Be it known that I, SAMUEL M. HOLTON, a citizen of the United States, residing at Battle Creek, in the county of Calhoun and State of Michigan, have invented new and useful Improvements in Combined Dish Rinsers and Driers, of which the following is a specification.

This invention provides an appliance having for its object the thorough rinsing and quick drying of dishes and table ware with a minimum amount of effort on the part of the dish washer.

The invention contemplates a device which is adapted to be placed in a pan to receive the dishes and table ware as the same is washed so that the articles may be subsequently quickly rinsed with hot water which besides removing every trace of the dish water serves to heat the dishes with the result that the drying with a towel may be quickly and effectively performed without any very great effort on the part of the person performing the work.

The invention contemplates a base provided with projections to engage the dishes and hold the same in upright position, a receptacle rotatably mounted upon the base and adapted to receive hot water and the table ware, such as knives, forks, spoons and the like, a spout projecting outwardly from the receptacle and having perforations throughout its length to deliver the hot water in fine jets upon the dishes supported upon the base, and a valve or gate for controlling the outflow of the hot water from the receptacle into the spout when it is required to rinse the dishes.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a combined dish rinser and drier embodying the invention, the dotted lines showing the outline of the pan in which the appliance is placed when in operation. Fig. 2 is a vertical central section of the device, the dotted lines showing dishes supported upon the base and table ware placed in the receptacle. Fig. 3 is a detail perspective view of the base, and Fig. 4 is a detail view showing more clearly the valve or gate for controlling the outflow of the hot water from the receptacle.

Corresponding and like parts are referred to in the following description, and indicated in all the views of the drawings, by the same reference characters.

The base 1 is preferably of sheet metal having a circular outline and has upwardly extending projections 2 which are adapted to engage the dishes to retain them in proper position for receiving a shower of hot water when rinsing the same. The projections 2 consist of parts of the base and are partly cut from the sheet metal and bent upwardly. A tube 3 projects upwardly from the center of the base and serves the two-fold purpose of a handle and a support for the receptacle 4. The tube 3 is formed from sheet metal and is soldered or otherwise firmly secured at its lower end to the base 1.

The receptacle 4 may be of any capacity and is circular in outline and of a less diameter than the base 1 and of a height to receive the table ware and an ample supply of hot water. A stem 5 is pendent from the receptacle 4 and is attached thereto at a central point, said stem fitting within the tube 3 in a manner to support the receptacle 4 and admit of its having a free rotary movement. A spout 6 projects laterally from the lower portion of the receptacle 4 and is provided at its outer end with a knob 7 which is adapted to be grasped when it is required to rotate the receptacle so as to deliver a spray of hot water upon the dishes held in place upon the base 1. A valve or gate 8 controls the opening between the receptacle and spout and is adapted to be operated by means of a rod 9 which extends to the top of the receptacle where it may be conveniently reached to admit of operating the valve or gate either to admit of the hot water flowing from the receptacle into the spout or of shutting off such outflow. The valve 8 as shown consists of a plate which is mounted in suitable guides provided upon the inner side of the receptacle, the rod 9 being held in place by means of guides likewise provided upon the inner side of the receptacle.

When in operation the device is placed in a pan, as indicated by the dotted lines in Fig. 1, and the dishes as they are washed are placed upon the base 1 and held in upright position by the projections 2. The table ware, such as knives, forks and spoons, is placed in the receptacle 4. When it is required to rinse the articles hot water is poured into the receptacle 4, thereby removing all trace of the dish water from the table ware and facilitating the drying thereof. To rinse and at the same time heat the dishes the valve 8 is moved to uncover the opening leading to the spout 6 and the hot water flowing from the receptacle into said spout escapes from the latter through the perforations and discharges in a spray or fine jets upon the dishes. To insure all the dishes being rinsed the receptacle is rotated, this being effected by grasping the knob 7 and moving the spout whereby the spray discharging therefrom is received upon the dishes, thereby rinsing and at the same time heating them so that the subsequent drying may be quickly and effectively performed.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A device of the character specified for the purposes set forth comprising a base, a receptacle rotatably mounted upon the base and having a laterally extending spout provided in its length with a plurality of small openings, and means for establishing communication between the receptacle and spout.

2. In an appliance of the character described for the purposes set forth, the combination of a base having an upright, a receptacle provided with a stem adapted to coöperate with said upright of the base to rotatably support the receptacle, a spout projecting laterally from the receptacle and having a plurality of small openings in its length, and a valve for controlling communication between the receptacle and spout.

3. In an appliance of the character set forth a base having portions partly cut therefrom and bent upwardly to form supporting projections, and a receptacle rotatably mounted upon the base and having a spout adapted to discharge a plurality of jets upon the base and the article supported thereon.

4. In a device of the character set forth the combination of a base provided with upwardly extending projections and having a centrally disposed tube, and a receptacle rotatably mounted upon the base having a stem fitted to said tube to hold the receptacle in place and admit of its rotation, said receptacle having a spout provided with openings for delivering jets upon the articles supported upon said base.

In testimony whereof I affix my signature in presence of two witnesses.

SAMUEL M. HOLTON.

Witnesses:
  I. W. TAYLOR,
  JAMES H. PHILLIPS.